Oct. 28, 1924.
J. L. HARTELL
1,513,042
SPRING PERCH
Filed April 18, 1922
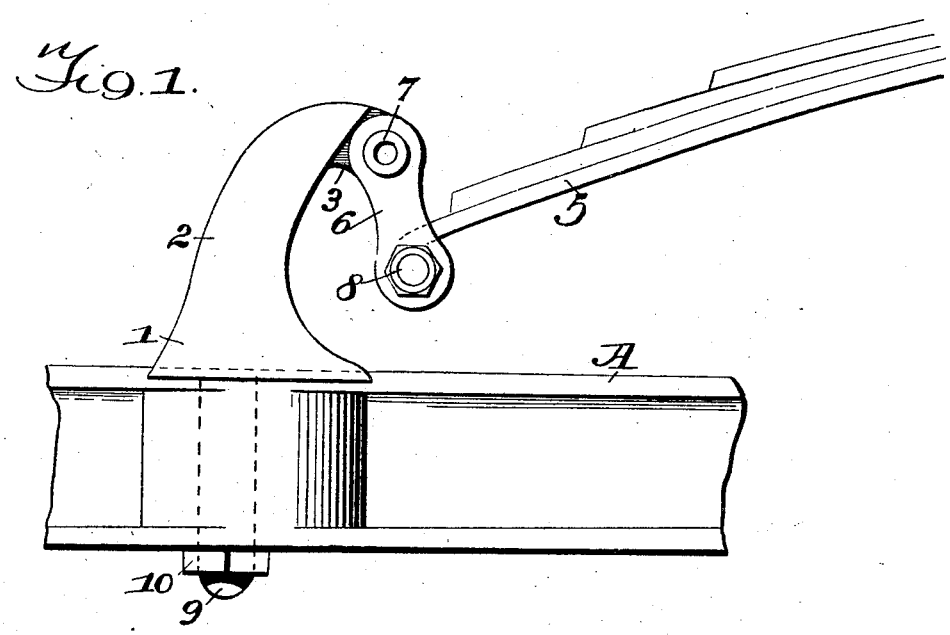
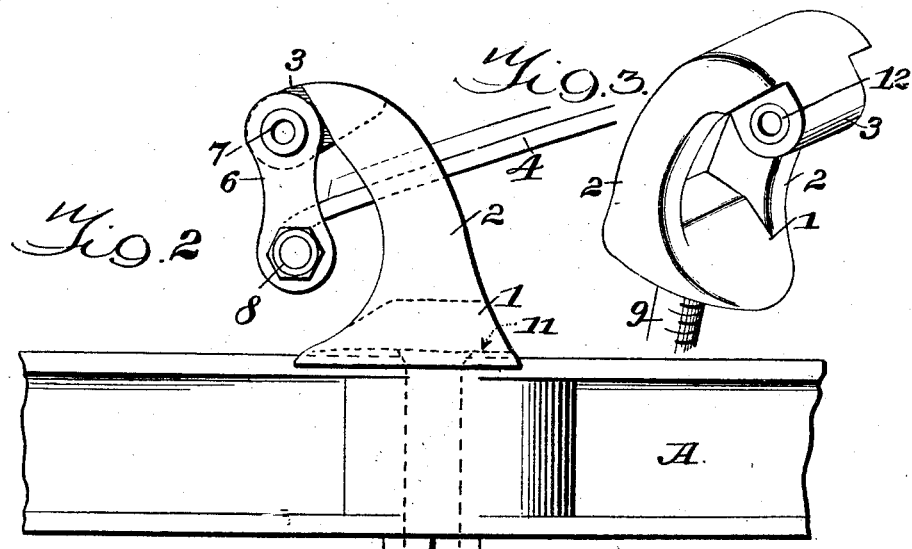
WITNESSES
INVENTOR
J. L. HARTELL,
BY
ATTORNEYS Patented Oct. 28, 1924.

1,513,042

UNITED STATES PATENT OFFICE.

JOSEPH L. HARTELL, OF BRAINERD, MINNESOTA.

SPRING PERCH.

Application filed April 18, 1922. Serial No. 554,601.

*To all whom it may concern:*

Be it known that I, JOSEPH L. HARTELL, a citizen of the United States, and a resident of Brainerd, in the county of Crow Wing and State of Minnesota, have invented certain new and useful Improvements in Spring Perches, of which the following is a specification.

My invention relates to improvements in spring perches, and it consists substantially of the construction and mode of operation herein described and claimed.

One of the foremost objects of the invention is to provide a spring perch for automobiles, which can be reversed so as to accommodate either long or short springs.

Other objects and advantages will appear in the following specification, reference being had to the accompanying drawing, in which:—

Fig. 1 is a front elevation of a portion of the front axle of an automobile illustrating the improved perch in position to accommodate a short spring, Fig. 2 is a similar view showing the perch reversed to accommodate a long spring, and Fig. 3 is a detail perspective view of the spring perch.

The improved spring perch is composed of a metallic body which has a base portion 1 from which a pair of separated arms 2 rise to a point where a lug 3 extends off to one side. The arms 2 are described as being spaced apart, this for the purpose of admitting the lower leaf of the long spring 4 when the perch is reversed (Fig. 2) for such accommodation.

It is intended that the perch shall be used for either short or long springs. When used for a short spring 5, the perch is turned into the position shown in Fig. 1. The shackles 6 are pivotally secured by the bolt 7 on each side of the lug 3 and extend down about as shown, to the place where the spring makes its connection at the bolt 8. The front spring (especially of the Ford automobile) is thirty-one inches long, and the perch in Fig. 1 is adapted to take this size of spring.

It occurs, however, that these springs will break and it is not always easy to replace it by a spring of the same size. Should it be possible to obtain the longer and standard forty inch spring, the owner of the automobile can readily turn the two perches around into the position shown in Fig. 2, extend the ends of the spring between the arms 2 and fasten them to the shackles 6 in the same manner as before.

The base 1 of the spring perch includes the bolt 9 which passes through the axle A on the under side of which it is secured by the nut 10. The under side of the base is slightly concaved at 11 so that the base may more readily be applied to the upper surface of the axle which usually is somewhat rounded. Obviously this close application of the base to the slightly rounded upper surface of the axle will prevent turning of the perch. Fig. 3 illustrates the use of a bushing 12 in the lug 3, which bushing may be replaced when worn.

While the construction and arrangement of the improved spring perch as herein described and claimed, is that of a generally preferred form, obviously modifications and changes may be made without departing from the spirit of the invention or the scope of the claims.

I claim:—

1. A spring perch composed of a base, means by which the perch may be secured to an automobile axle in either a normal or a reversed position, a pair of arms upstanding from the base and spaced apart to admit the end of a spring when the perch is reversed for a long spring, and a lug at the upper end of the perch between the extremities of the arms for the mounting of a pair of shackles.

2. A spring perch composed of a base with a concaved under surface to fit the corresponding surface of an axle, an integral bolt by which the perch is secured on the axle in either a normal or a reversed position, a lug to carry a pair of spring shackles, and a pair of arms carrying the lug at the upper extremities rising from the base and being spaced apart to make room for the end of a spring when the perch is reversed on the axle for a long spring.

3. In a motor vehicle a spring construction formed with an upwardly bent central portion arranged for connection with the body of the vehicle, a pair of spring perches capable of being connected to an axle construction, said perches being reversed in position and including vertically disposed slots through which the outer ends of said spring are adapted to project, and a pivoted shackle connection between the upper ends of said perches and the extreme outer ends of said spring.

JOSEPH L. HARTELL.